(12) United States Patent
Hsieh et al.

(10) Patent No.: US 8,145,052 B2
(45) Date of Patent: Mar. 27, 2012

(54) APERTURE CONTROLLING SYSTEM

(75) Inventors: Ming-Chih Hsieh, Taipei Hsien (TW); Lien-Hsun Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 36 days.

(21) Appl. No.: 12/869,703

(22) Filed: Aug. 26, 2010

(65) Prior Publication Data
US 2011/0299844 A1 Dec. 8, 2011

(30) Foreign Application Priority Data

Jun. 4, 2010 (TW) .............................. 99118285 A

(51) Int. Cl.
*G03B 7/085* (2006.01)

(52) U.S. Cl. ....................................... 396/257; 348/363

(58) Field of Classification Search .................. 396/257; 348/363
See application file for complete search history.

(56) References Cited

U.S. PATENT DOCUMENTS 5,880,782 A * 3/1999 Koyanagi et al. ............. 348/364
6,690,424 B1 * 2/2004 Hanagata et al. ............. 348/364

* cited by examiner

*Primary Examiner* — Rodney Fuller
*Assistant Examiner* — Fang-Chi Chang
(74) *Attorney, Agent, or Firm* — Altis Law Group, Inc.

(57) ABSTRACT

An aperture controlling system includes a CMOS image sensor, a brightness encoder, an aperture and an aperture driving circuit. The brightness encoder is used for extracting brightness information sensed by the CMOS image sensor and converting the brightness information into digital codes. The aperture driving circuit includes a D/A converter, a motor coil driving circuit, an environment sensing module, a benchmark voltage generator and a motor. The motor is mechanically connected to the aperture. The motor coil driving circuit includes a voltage comparator. The input and the output of the D/A converter are respectively coupled to the brightness encoder and the inverting input of the voltage comparator. The input and the output of the benchmark voltage generator are respectively coupled to the environment sensing module and the non-inverting input of the voltage comparator. The output of voltage comparator is connected to the motor.

9 Claims, 2 Drawing Sheets

APERTURE CONTROLLING SYSTEM

BACKGROUND

1. Technical Field

The present disclosure relates to an aperture controlling system.

2. Description of Related Art

Most current digital cameras use Charge Coupled Devices (CCDs) to convert optical signals into electronic signals. However, the CCD must be supplied with 12 volts direct current to drive charges of each pixel of the CCD to move into an associated transmission channel. As a result, the CCDs must include numerous complicated circuits. As an alternative, Complementary Metal Oxide Semiconductor (CMOS) sensors, which are low-cost, low power consuming, and high integratable, become more and more favored by consumers.

In general, an aperture of a digital camera is controlled by an aperture driving circuit that must use NTSC/PAL signals output from the CCD. However, if a CMOS is equipped in a camera instead of a CCD, the aperture driving circuit would not be able to function properly because the image signals output from the CMOS are digital video signals unsuitable for use in the original aperture driving circuit to control the aperture.

Therefore, it is desirable to provide an aperture controlling system which can overcome the above problems.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Embodiments of the present disclosure will now be described in detail below and with reference to the drawings.

Figure 1:
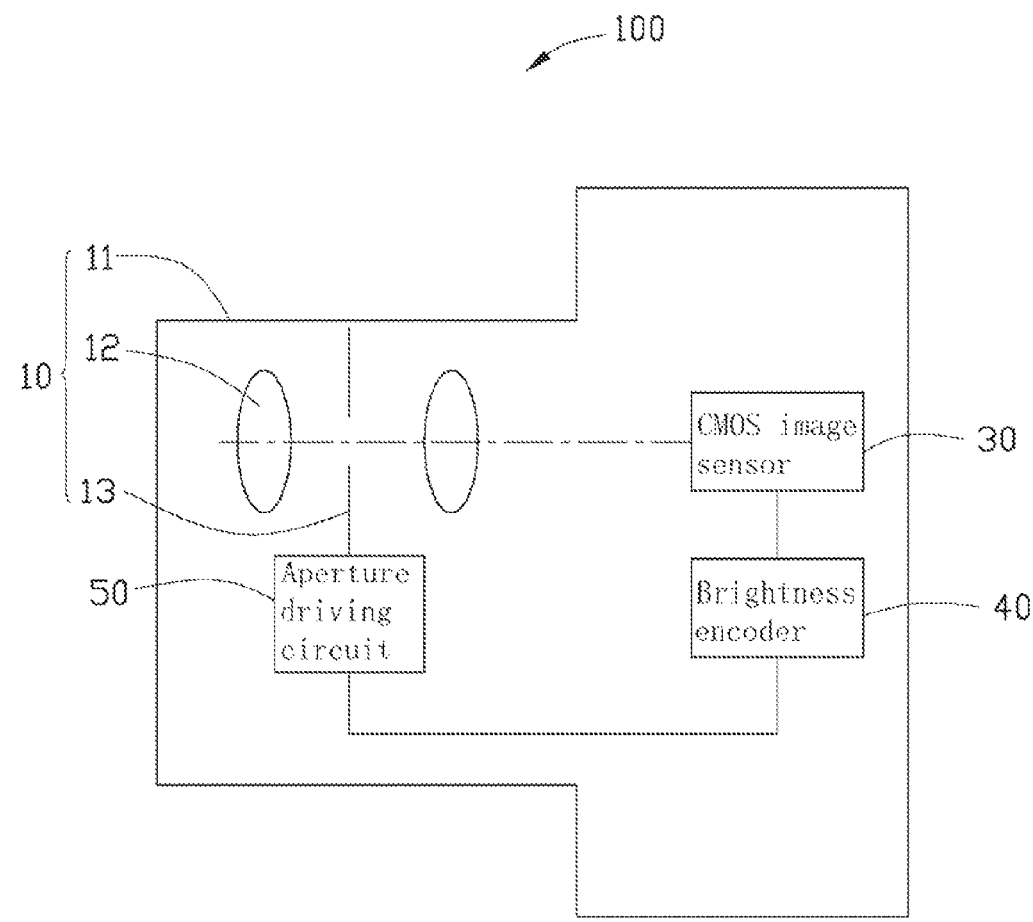
FIG. 1 is a schematic view of an aperture controlling system according to an exemplary embodiment.
Figure 2:
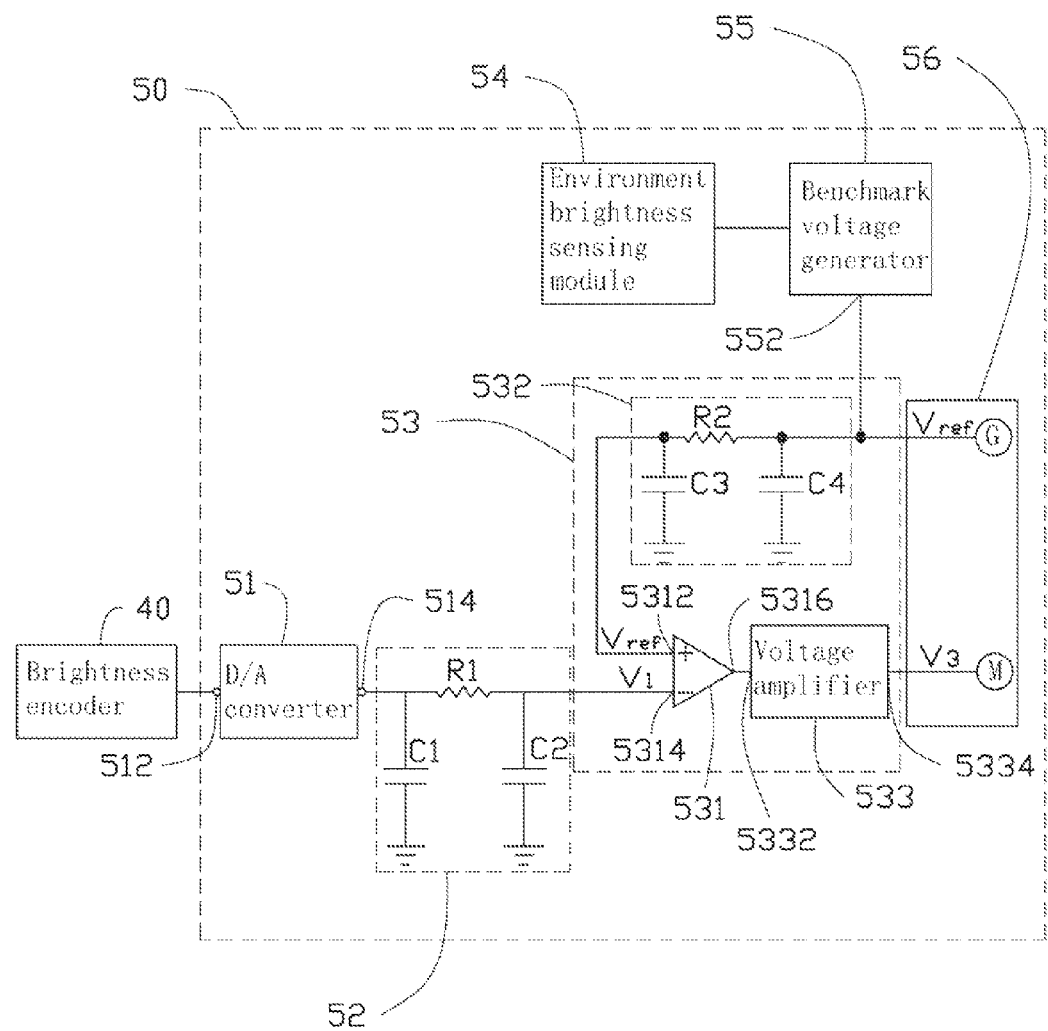
FIG. 2 is a schematic view of an aperture driving circuit of the aperture controlling system of FIG. 1.

Referring to FIGS. 1-2, an aperture controlling system 100 according to an exemplary embodiment, includes a lens module 10, a complementary metal oxide semiconductor (CMOS) image sensor 30, a brightness encoder 40, and an aperture driving circuit 50. The lens module 10 aligns with the CMOS image sensor 30. The CMOS image sensor 30 is electrically coupled to the brightness encoder 40. The brightness encoder 40 is electrically coupled to the aperture driving circuit 50.

The lens module 10 includes a lens barrel 11, a number of lenses 12, and an aperture 13. Both the lenses 12 and the aperture 13 are received in the lens barrel 11. In the present embodiment, the aperture 13 is interposed between two adjacent lenses 12.

The CMOS image sensor 30 is configured to convert light signals received by the lens module 10 into digital electronic signals.

The brightness encoder 40 is configured for extracting brightness information sensed by the CMOS image sensor 30 and converting the brightness information into digital codes. For example, when the extracted brightness information is 40 lumens, the brightness encoder 40 may be configured to output a digital code 000 000 001, and for 70 lumens, the brightness encoder 40 may be configured to output code 000 000 100. The digital codes output by the brightness encoder 40 are input to the aperture driving circuit 50.

The aperture driving circuit 50 is configured for driving the aperture 13 clockwise or counterclockwise to control luminous flux through the aperture 13. The aperture driving circuit 50 includes a D/A converter 51, a first bridged-$\pi$ filter 52, a motor coil driving circuit 53, an environment brightness sensing module 54, a benchmark voltage generator 55, and a motor 56.

The D/A converter 51 is configured for converting the digital codes output by the brightness encoder 40 into analog signals. In particular, the D/A converter 51 is configured for converting the digital codes output by the brightness encoder 40 into a first voltage V1. The D/A converter 51 includes an input 512 electrically coupled to the brightness encode 40, and an output 514 electrically coupled to the first bridged-$\pi$ filter 52.

The first bridged-$\pi$ filter 52 is configured for filtering spurious signal output by the D/A converter 51. The first bridged-$\pi$ filter 52 includes a first capacitor C1, a second capacitor C2, and a first resistance R1. An anode of the first capacitor C1 is electrically connected to the output 514 of the D/A converter 51, and a cathode of the first capacitor C1 is grounded. An anode of the second capacitor C2 is electrically connected to the output 514 of the D/A converter 51, and a cathode of the second capacitor C2 is grounded. The first resistance R1 is electrically connected between the anodes of the first capacitor C1 and the second capacitor C2.

The motor coil driving circuit 53 includes a voltage comparator 531 with integral feature, a second bridged-$\pi$ filter 532, and a voltage amplifier 533. The voltage comparator 531 includes a non-inverting input 5312, an inverting input 5314, and an output 5316. The inverting input 5314 is connected to the first bridged-$\pi$ filter 52. The second bridged-$\pi$ filter 532 includes a second resistance R2, a third capacitor C3, and a fourth capacitor C4. An anode of the third capacitor C3 is electrically connected to the non-inverting input 5321 of the voltage comparator 531. A cathode of the third capacitor C3 is grounded. An anode of the fourth capacitor C4 is electrically connected to an output 552 of the benchmark voltage generator 55, and a cathode of the fourth capacitor C4 is grounded. The second resistance R2 is electrically connected between the anodes of the third capacitor C3 and the fourth capacitor C4. The second bridged-$\pi$ filter 532 is configured for filtering spurious signals output by the benchmark voltage generator 55.

The environment brightness sensing module 54 is configured for measuring the brightness of the environment, and storing a number of digital codes. Each of the digital codes corresponds to a level of brightness of the environment.

The benchmark voltage generator 55 is configured for converting the digital codes corresponding to different levels of the brightness of the environment measured by the environment brightness sensing module 54 into a second voltage.

The motor 56 is mechanically connected to the aperture 13 for controlling the aperture 13 to adjust the luminous flux, and includes a counterclockwise coil G electrically connected to the output 552 of the benchmark voltage generator 55, and a clockwise coil M.

The voltage amplifier 533 includes an input 5332 electrically coupled to the output 5316 of the voltage comparator 531, and an output 5334 electrically connected to the clockwise coil M of motor 56. In the present embodiment, when the voltage of the clockwise coil M is higher than that of the counterclockwise coil G, the aperture 13 is rotated clockwise to decrease the luminous flux. Otherwise, the aperture 13 is rotated counterclockwise to increase the luminous flux as the voltage of the clockwise coil M being lower than that of the counterclockwise coil G. When the voltage of the clockwise coil M is equal to that of the counterclockwise coil G, the aperture 13 maintains its initial position.

In an alternative embodiment, the aperture driving circuit 50 may omit the first bridged-π filter 52 and the second bridged-π filter 532, thereby, the output 514 of the D/A converter 51 is directly connected to the inverting input 5314 of the voltage comparator 531, and the output 552 of the benchmark voltage generator 55 is directly connected to the non-inverting input 5312 of the voltage comparator 531.

In use, when the aperture controlling system 100 is powered, the aperture 13 is opened to a default diameter, at the same time, the brightness encoder 40 extracts brightness information sensed by the CMOS image sensor 30 and converts the brightness information into digital codes. The D/A converter 51 converts the digital codes into an analog first voltage V1 signal. Then the first voltage V1 is transmitted to the inverting input 5314 of the voltage comparator 531. The benchmark voltage generator 55 generates a second voltage $V_{ref}$ based on the brightness of the environment measured by the environment brightness sensing module 54, then the second voltage $V_{ref}$ is transmitted to the non-inverting input 5312 of the voltage comparator 531.

When the second voltage $V_{ref}$ is higher than the first voltage V1, the output 5316 of the voltage comparator 531 outputs the second voltage $V_{ref}$, then the second voltage $V_{ref}$ is input into the input 5332 of the voltage amplifier 533 to amplify, therefore, the clockwise coil M of the motor 56 receives an amplified voltage $V3=KV_{ref}$, wherein K is the magnification of the voltage amplifier 533 and is equal to or higher than 1, therefore, the voltage V3 is higher than the voltage of the counterclockwise coil G which is equal to the second voltage $V_{ref}$, the motor 56 drives the aperture 13 rotating clockwise to decrease the luminous flux.

When the second voltage $V_{ref}$ is lower than the first voltage V1, the output 5316 of the voltage comparator 531 outputs a negative of first voltage V1, then the negative of the first voltage V1 is input into the input 5332 of the voltage amplifier 533 to amplify, therefore, the clockwise coil M of the motor 56 receives an amplified voltage $V3=-KV_{ref}$, therefore, the voltage V3 is lower than the voltage of the counterclockwise coil G which is equal to the second voltage $V_{ref}$, the motor 56 drives the aperture 13 rotating counterclockwise to increase the luminous flux.

When the first voltage V1 is equal to the second voltage $V_{ref}$, the magnification of the voltage amplifier 533 of K is equal to 1, voltage of the clockwise coil M of the voltage V3 is equal to that of the counterclockwise coil G of $V_{ref}$, the aperture 13 stops rotating to end controlling the luminous flux of the aperture 13.

It will be understood that the above particular embodiments is shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. An aperture controlling system, comprising:
   a lens module comprising a plurality of lenses and an aperture positioned between two adjacent lenses;
   a CMOS image sensor aligned with the lens module;
   a brightness encoder configured for extracting brightness information sensed by the CMOS image sensor and converting the brightness information into digital codes; and
   an aperture driving circuit comprising a D/A converter, a motor coil driving circuit, an environment brightness sensing module, a benchmark voltage generator and a motor mechanically connected to the aperture, the motor coil driving circuit comprising a voltage comparator, an input of the D/A converter being coupled to the brightness encoder, an output of the D/A converter being coupled to an inverting input of the voltage comparator, the D/A converter being configured for converting the digital codes output by the brightness encoder into a first voltage, an input of the benchmark voltage generator being coupled to the environment brightness sensing module, an output of the benchmark voltage generator being coupled to the non-inverting input of the voltage comparator and the motor, an output of the voltage comparator being connected to the motor;
   wherein the environment brightness sensing module is configured for measuring the brightness of the environment and storing a plurality of digital codes, each of the digital codes corresponds to one brightness value of the environment, the benchmark voltage generator is configured for converting the digital codes outputted from the environment brightness sensing module into a second voltage, the voltage comparator is configured for comparing the first voltage and the second voltage to control the motor to rotate the aperture counterclockwise or rotate the aperture clockwise.

2. The aperture controlling system of claim 1, wherein the motor comprises a counterclockwise coil and a clockwise coil, the motor coil driving circuit further comprises a voltage amplifier, the counterclockwise coil is electrically coupled to the output of the benchmark voltage generator, an input of the voltage amplifier is electrically coupled to the output of the voltage comparator, the output of the voltage amplifier is electrically coupled to the clockwise coil of the motor.

3. The aperture controlling system of claim 2, wherein when the voltage of the clockwise coil is higher than that of the counterclockwise coil, the aperture is rotated clockwise to decrease the luminous flux of the aperture; when the voltage of the clockwise coil is lower than that of the counterclockwise coil, the aperture is rotated counterclockwise to increase the luminous flux; when the voltage of the clockwise coil is equal to that of the counterclockwise coil, the aperture stops rotating.

4. The aperture controlling system of claim 3, wherein when the second voltage is higher than the first voltage, the output of the voltage comparator outputs the second voltage to the input of the voltage amplifier to amplify, and the clockwise coil of the motor receives an amplified voltage higher than the voltage of the counterclockwise coil, the motor drives the aperture to rotate clockwise to decrease the luminous flux.

5. The aperture controlling system of claim 3, wherein when the second voltage is lower than the first voltage, the output of the voltage comparator outputs the negative of the first voltage, then the negative of the first voltage is input into the input of the voltage amplifier to amplify, the clockwise coil of the motor receives an amplified negative voltage that is lower than the voltage of the counterclockwise coil, the motor drives the aperture to rotate counterclockwise to increase the luminous flux.

6. The aperture controlling system of claim 3, wherein when the first voltage is equal to the second voltage, voltage of the clockwise coil is equal to that of the counterclockwise coil, the aperture stops rotating to end the controlling of the luminous flux of the aperture.

7. The aperture controlling system of claim 2, wherein the aperture driving circuit further comprises a first bridged-π filter configured for filtering spurious signals output by the D/A converter, the first bridged-π filter comprises a first capacitor, a second capacitor, and a first resistance, an anode of the first capacitor is electrically connected to the output of the D/A converter, a cathode of the first capacitor is grounded, an anode of the second capacitor is electrically connected to the inverting input of the voltage comparator, a cathode of the second capacitor is grounded, the first resistance is electrically connected between the anodes of the first capacitor and the second capacitor.

8. The aperture controlling system of claim 2, wherein the motor coil driving circuit further comprises a second bridged-π filter configured for filtering spurious signal output by the benchmark voltage generator, the second bridged-π filter comprises a second resistance, a third capacitor, and a fourth capacitor, an anode of the third capacitor is electrically connected to the non-inverting input of the voltage comparator, a cathode of the third capacitor is grounded, an anode of the fourth capacitor is electrically connected to the output of the benchmark voltage generator, a cathode of the fourth capacitor is grounded, the second resistance is electrically connected between the anodes of the third capacitor and the fourth capacitor.

9. The aperture controlling system of claim 1, wherein the voltage comparator has integral feature.

* * * * *